*INVENTOR.*
HIROSHI AKAHORI
BY
ATTORNEYS

INVENTOR.
HIROSHI AKAHORI 3,452,194
PHOTOGRAPHING SHUTTER AND FLUORESCENT PLATE STRUCTURE FOR ELECTRON MICROSCOPES
Hiroshi Akahori, Katsuta-shi, Japan, assignor to Hitachi, Ltd., Tokyo-to, Japan
Filed June 30, 1966, Ser. No. 561,893
Claims priority, application Japan, June 30, 1965, 40/52,874
Int. Cl. H01j *37/26*
U.S. Cl. 250—49.5              11 Claims

ABSTRACT OF THE DISCLOSURE

A photographic shutter for use in an image observation device, comprising an upper plate, which includes a main fluorescent plate having a central electron-passing aperture therein and an auxiliary fluorescent plate rotatably mounted within the central aperture of the main fluorescent plate, one surface of the auxiliary fluorescent plate including a fluorescent screen having a structure resistant to electron bombardment, the opposite surface of the auxiliary fluorescent plate including a conventional fluorescent screen, and a base plate including an electron-passing aperture therein, and an auxiliary shutter on the base plate for opening or closing the electron-passing aperture therein, the auxiliary shutter being actuated by the rotation of the auxiliary fluorescent plate.

---

This invention relates to a photographic shutter for electron microscopes, and more particularly to a photographic shutter which may also be useful for an image observation device.

In electron microscopes, the final image of a specimen is formed on a viewing fluorescent screen which converts an electron beam into visible light, and the final image formed on the screen can be observed with the naked eye or with an optical magnifying glass through a viewing window provided in the wall of the electron microscope. In many cases, the fluorescent screen is prepared in the form of a film coated on the surface of the photographic shutter, which is used for photographing the final image. During the photographing of the electron image, the photographic shutter is turned up, and the image-forming electrons are projected onto a photographic plate located within the camera box of the electron microscope.

The viewing fluorescent screen on the shutter is also used for an image observation device to adjust the optical axis and focus the electron beam. In the case of the axis-adjustment work, the finely focused electron beam, which is obtained by stopping the supply of the exciting currents to all electron lenses is projected onto the fluorescent screen. Thus, the fluorescent screen is subject to deterioration or burning by electron bombardment with the electrons usually having a very high energy. On the other hand, in case of the focus-adjustment work, the photographic shutter is inclined so as to face straight the magnifying glass in order to obtain the best condition for observing the electron image. During this time, however, the central portion of the fluorescent screen is forced to move with the inclination of the photographic shutter. Consequently, the inclination of the photographic shutter assumes ultimately such a disadvantageous position that it is impossible to observe the final image under the same conditions as exist during normal image-observation.

Accordingly, it is an object of the present invention to provide an electron microscope with a photographic shutter which eliminates by extremely simple means the shortcomings and drawbacks encountered with the prior art systems.

It is another object of the present invention to provide a photographic shutter which helps in remarkably reducing deterioration and/or burning of the fluorescent screen.

Still another object of the present invention resides in a photographic shutter by means of which the focus-adjusting work can be carried out without having to move the central portion of the fluorescent screen.

A further object of the present invention is to provide a photographic shutter which is useful in the image observation using either television or movie techniques.

According to the present invention, an auxiliary fluorescent plate is rotatably mounted in a central, electron-passing aperture of a main fluorescent plate which constitutes the upper plate of the photographic shutter. Two different fluorescent screens are provided on the two surfaces of the auxiliary fluorescent plate, one of which is used in the course of normal image-observation and focus-adjusting work, and the other one of which is used in the axis-adjusting work. The fluorescent screen for the axis-adjusting work is composed of a resistive structure against electron bombardment so that both fluorescent screens maintain over a long time their expected performances. In case of the focus-adjusting work, only the auxiliary fluorescent plate is inclined at a desired angle about its axis of rotation and is positioned so as to face straight the magnifying glass or other optical magnifying device. The central portions of the fluorescent screen on the auxiliary fluorescent plate move only slightly upon rotation of the auxiliary plate because the central portions are located near the axis of rotation of the auxiliary fluorescent plate.

In one embodiment of the present invention, an auxiliary shutter is additionally provided on the base plate of the photographic shutter. This auxiliary shutter is driven or actuated by the auxiliary fluorescent plate in the course of rotation thereof so as to open or close an electron-passing aperture formed on the base plate. Accordingly, the limit and desired field of the electron image can be projected onto a television or movie camera through the apertures of the photographic shutter.

These, as well as additional objects and advantages of the present invention will become more apparent from the following description when taken in connection with the accompanying drawing which shows, for purposes of illustration only, one embodiment in accordance with the present invention, and wherein.

Figure 2:
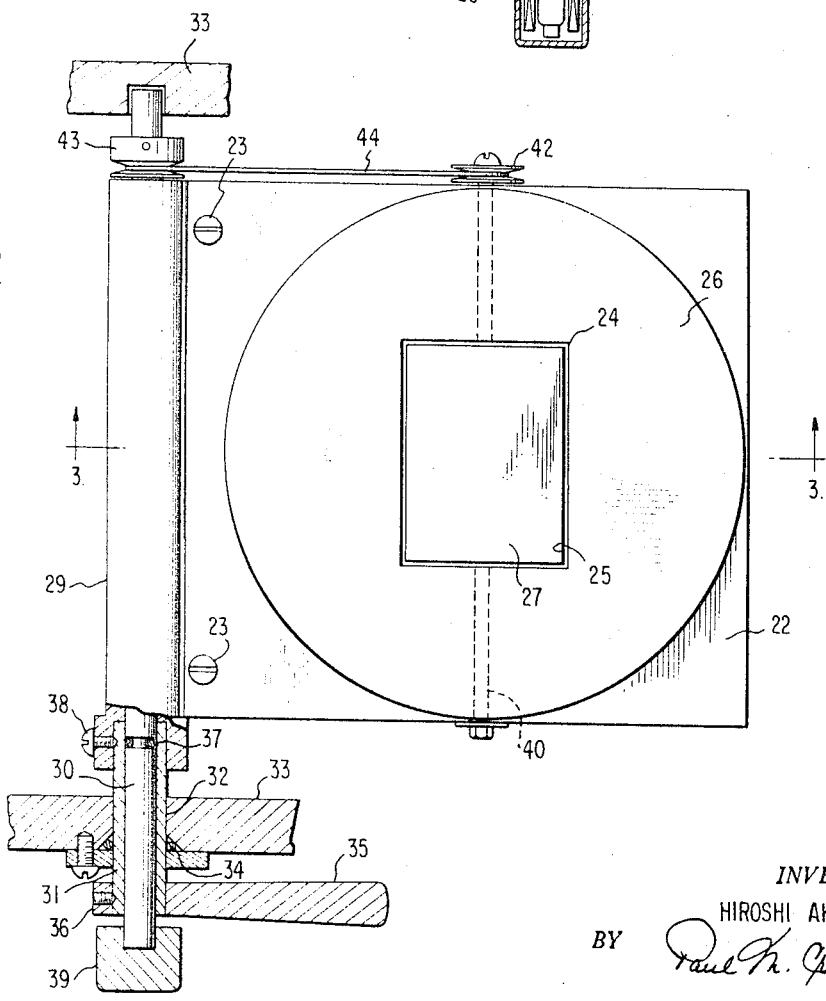
FIGURE 2 is an enlarged plan view of the photographic shutter of FIGURE 1, with parts thereof in cross section for the sake of clarity.
Figure 3:
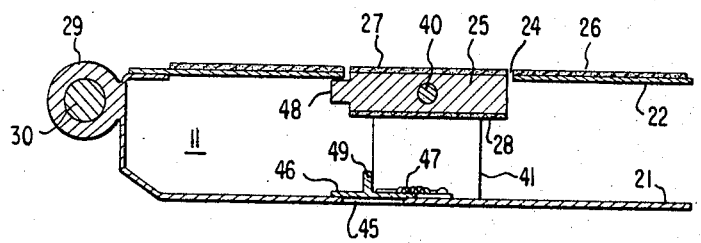
Figure 4:
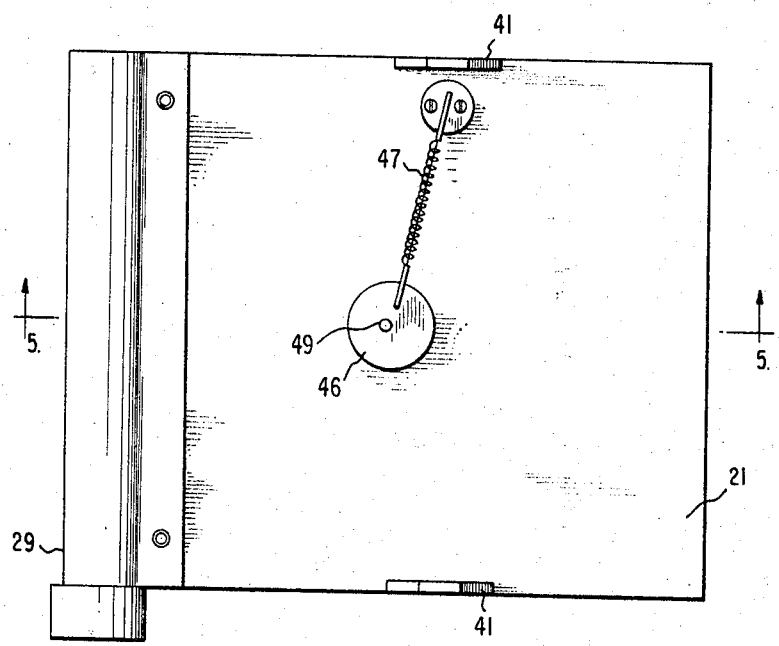
Figure 5:
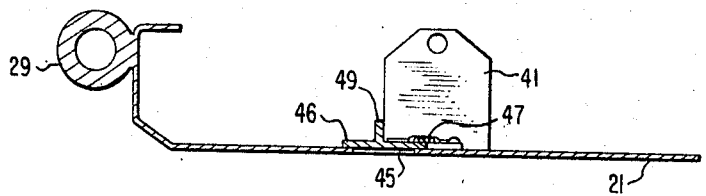

FIGURES 3, 3a, 3b, and 3c are cross-sectional views taken along line 3—3 of FIGURE 2 of the photographic shutter structure in accordance with the present invention and illustrating the operation thereof;

FIGURE 4 is a plan view, on an enlarged scale, on a base plate constituting a part of the photographic shutter of FIGURES 2 and 3, and FIGURE 5 is a cross-sectional view taken along line 5—5 of FIGURE 4.

Figure 1:
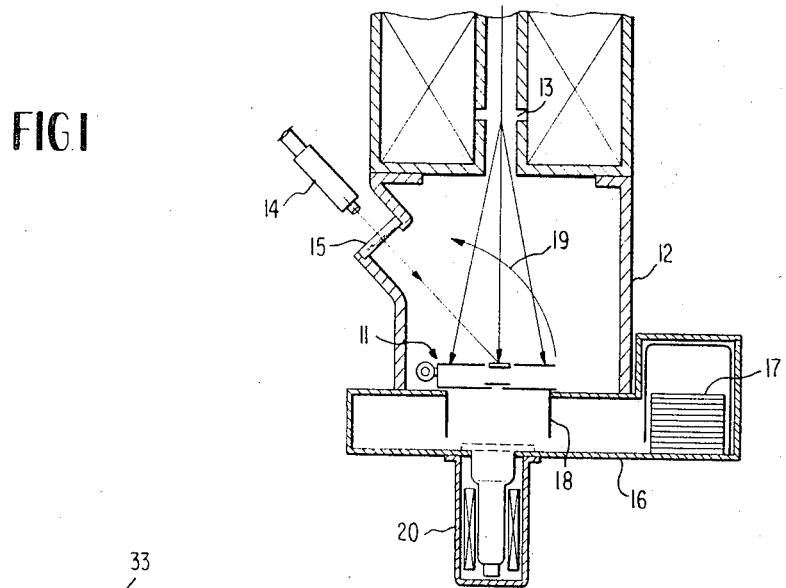
FIGURE 1 is a cross-sectional view of a part of an electron microscpoe having a photographic shutter embodying the present invention.

Referring now to the drawing wherein like reference numerals are used throughout the various views to designate like parts, and more particularly to FIGURE 1, the photographic shutter which is generally designated by reference numeral 11 is arranged within a viewing chamber 12 of the electron microscope, otherwise of any known construction. During normal observation of an electron image, the photographing shutter 11 is set to the position thereof shown in FIGURE 1, and the final image, enlarged by a projection lens 13 is projected onto the fluorescent screen provided on the shutter 11. Thus, the final image can be observed either with the naked eye or by means of an optical magnifying device 14 through a window 15 provided in the wall of the viewing chamber 12.

A plurality of photographic plates 17 are stored, one stacked upon the other, in a camera box 16 fitted to the bottom of the viewing chamber 12. In case of photographing the final image, one of the plates 16 is pulled out and placed at the bottom of a light-shielding member 18 as shown in dotted line in FIGURE 1. Next, the photographing shutter 11 is turned up in the direction indicated by arrow 19 so as to expose the photographic plate to the image-producing electrons. A television pick-up camera 20 is fitted at the bottom of the camera box 16.

Referring to FIGURES 2 and 3, which illustrate the details of the structure of the photographic shutter 11 shown in FIGURE 1, the photographic shutter 11 comprises two main portions, i.e., a metallic base plate 21 and a metallic upper plate 22 which constitutes a main fluorescent plate. The main fluorescent plate 22 is fixed to the base plate 21 by any conventional means, such as screws 23, to form a box-like structure. The main fluorescent plate 22 is provided with a central, electron-passing aperture 24; a metallic auxiliary fluorescent plate 25 is rotatably mounted within the aperture 24. A main fluorescent screen 26 which consists of a fluorescent material having, for example, high contrast or high brightness characteristics, is provided on the surface of the main fluorescent plate 22 by any known, conventional methods. On one surface of the auxiliary fluorescent plate 25, an auxiliary fluorescent screen 27 is provided which consists of the same material as that of the main fluorescent screen 26. On the opposite surface of the auxiliary fluorescent plate 25, a fluorescent screen 28 is provided which is resistive against electron bombardment. The fluorescent screen 28 may be of any conventional material, known in the prior art, for example, may comprise a fluorescent material coated onto the surface of the auxiliary plate 25 and a heavy metal coating provided over this fluorescent material. The heavy metal forming the metal coating is selected from such known metals as silver, gold, germanium, wolfram, etc. The metal coating sufficiently absorbs the energy of the electrons and protects the fluorescent material located therebelow.

The metallic base plate 21 includes a hollow shaft 29 at one side thereof, and an auxiliary shaft 30 is rotatably inserted into the hollow shaft 29. The projecting portion 31 of the hollow shaft 29 extends to the outside of the viewing chamber 12 through a bore 32 provided in the wall 33 of the viewing chamber. The extended portion 31 is rotatably supported within bore 32 with the use of a conventional shaft seal 34. A handle 35 fixed by a screw 36 to one end of the extended portion 31 is used for turning up the photographic shutter 11, i.e., for rotating the same as will be described more fully hereinafter.

The auxiliary shaft 30 extends within the hollow shaft 29, and one end thereof projects outside of the end of the extended portion 31 of the hollow shaft. A knob 39 fixed to the projecting end of the auxiliary shaft 30 is used for purposes of rotating the shaft 30. The other end of the auxiliary shaft 30 projecting beyond the hollow shaft 29 is rotatably supported by means of the bearings formed in the wall 33 of the viewing chamber. The small gap between the shafts 29 and 30 is sealed by means of a conventional shaft seal 37. A screw designated by reference numeral 38 operatively connects the hollow shaft 29 with the extended portion 31 thereof.

The shaft 40 of the auxiliary fluorescent plate 25 is rotatably supported by bearings 41 (FIGS. 4 and 5) in the form of bracket-like structures mounted on the base plate 21. A pulley 42 (FIG. 2) is secured to one end of the shaft 40, and a pulley 43 is fixed to one end of the shaft 30. The two pulleys 42 and 43 are operatively connected with each other by a belt 44.

Referring to FIGURES 4 and 5, the base plate 21 is provided with an electron-passing aperture 45. An auxiliary shutter plate 46 is located on the base plate 21 so as to normally close the aperture 45. Flexible supporting means, for example, a spring 47 is provided between the auxiliary shutter plate 46 and the base plate 21. The two ends of the springs are fixed, for example, by means of welding to the plates 21 and 46. The auxiliary shutter plate 46 is normally urged by the action of the spring 47 to close the aperture 45 of the base plate provided no force is supplied to the spring 47. On the other hand, a projection 48 is formed on one side of the auxiliary fluorescent plate 25 (FIG. 3), and another projection 49 is provided on the auxiliary shutter 46. Both projections 48 and 49 come in contact with each other in the course of rotation of the auxiliary fluorescent plate in the counterclockwise direction as shown in FIGURES 3a and 3b.

FIGURE 3 illustrates the position of the various parts in which is carried out the normal image observation. The final image, enlarged by the projection lens 13 (FIG. 1) is formed on the main and auxiliary screens 26 and 27 of the photographing shutter 11. Thus, it is possible to observe the final image formed on the photographing shutter 11 through the viewing window 15 (FIG. 1).

Figure 3A:
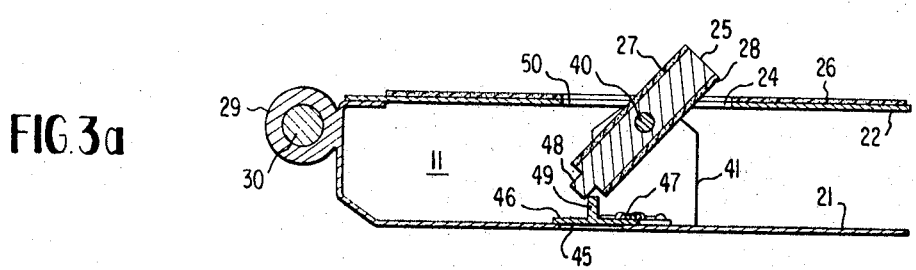

FIGURE 3a illustrates the position of the various parts in which is undertaken the focus-adjusting work. In this case, the knob 39 (FIG. 2) is caused to rotate in the left direction by the fingers of the operator. The rotation of the knob 39 is transmitted to the auxiliary fluorescent plate 25 by way of the auxiliary shaft 30, pulley 43, belt 44, pulley 42, and shaft 40 (FIG. 2). The auxiliary fluorescent plate 27 is therefore inclined about the axis of shaft 40 at a desired angle, for example, 45° to face straight the magnifying glass 14 (FIG. 1). In this position of the parts, it is possible to adjust the focus of the electron beam by observing the final image through the viewing window 15 (FIG. 1). As shown in the drawing, the shaft 40 of the auxiliary fluorescent plate 25 is located near the central portion of the auxiliary fluorescent screen 27 provided on the plate 25. Consequently, the central portion of the auxiliary fluorescent screen 27 moves only slightly upon rotation or inclination of the auxiliary fluorescent plate 25. This entails the advantage that it is possible to do the focus-adjusting work under similar conditions to those existing in normal image observation. It is preferable from this point of view to make the auxiliary fluorescent screen 25 as thin as possible.

Figure 3B:
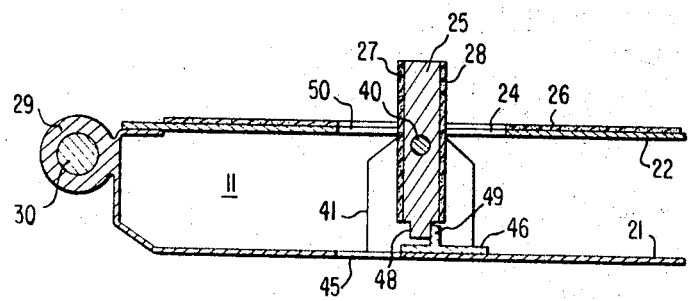

FIGURE 3b illustrates the position of the parts in which image observation using television techniques can be carried out. The auxiliary fluorescent plate 25 is inclined at an angle of 90° by rotation of the knob 39 (FIG. 2). In the course of the inclination, the projection 48 of plate 25 comes in contact with the projection 49 of the auxiliary shutter plate 46 and pushes the plate 46 against the spring 47 (FIG. 4) to open the aperture 45 of the base plate 21. The aperture 45 of the base plate 21 is located under the gap 50 which is formed between the auxiliary fluorescent plate 25 and the inside wall of the aperture 24 of the main fluorescent plate 22. Thus, the pick-up camera 20 (FIG. 1) of conventional construction is exposed to the image-producing electrons of a desired and limited field. Consequently, it is possible to observe the final image utilizing television viewing techniques as compared to observation through the viewing window 15.

Figure 3C:
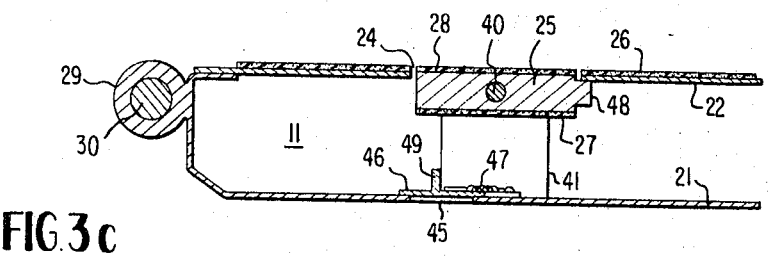

FIGURE 3c illustrates the position of the parts in which is carried out the axis-adjusting work. In this case, the auxiliary fluorescent plate 25 is turned about its axis through 180°. Consequently, the fluorescent screen 28 which is resistive against electron impact is exposed to the finely focused electron beam. Since the electron beam is concentrated along the axis of the microscope in the course of the axis-adjusting work, only the portion of the fluorescent screen adjacent the axis tends to be damaged by electron bombardment. However, according to the present invention, the fluorescent screen 28 which is resistive against electron bombardment, is provided on one surface of the auxiliary fluorescent plate 25 so that it is possible to reduce remarkably the deterioration or burning of the fluorescent material.

In case of photographing the final image, the photographing shutter 11 in its entirety is turned into the upright position thereof by handle 35 so that the photographic plate located in the camera box 16 is exposed to the image-producing electrons (FIGS. 1 and 2). This operation is similar to that in the prior art.

While I have shown and described only one embodiment of the present invention, it will be understood that the same is not limited thereto but is susceptible of numerous changes and modifications as known to a person skilled in the art, and I therefore do not wish to be limited to the details shown and described herein but intend to cover such modifications and changes as are encompassed within the scope of the appended claims.

I claim:

1. A fluorescent plate structure for an electron microscope having an electron beam adapted to produce an image, comprising fluorescent plate means having first surface means on which normally impinge the image-producing electrons of the electron beam during normal operation thereof and second surface means of a material relatively resistant to electron bombardment, and selectively operable actuating means for exposing said second surface means to bombardment by the electron beam, further comprising means for rotating the plate structure as a unit about an axis of rotation, wherein said plate means is provided with aperture means for the passage of at least a portion of the electron beam, shutter means for said aperture means, and means for automatically opening said shutter means upon activation of said selectively operable actuating means.

2. A fluorescent plate structure according to claim 1, wherein said second surface means is normally inoperative and is rendered operable by said actuating means.

3. A fluorescent plate structure according to claim 2, wherein said second surface means includes a rotatable element within an apertured area of said first surface means, said rotatable element having on one side thereof a surface material corresponding substantially to that of said first surface means and on the other side thereof the material resistant to electron bombardment.

4. A fluorescent plate structure according to claim 1, wherein said second surface means includes a rotatable element within an apertured area of said first surface means, said rotatable element having on one side thereof a surface material corresponding substantially to that of said first surface means and on the other side thereof the material resistant to electron bombardment.

5. A fluorescent plate structure according to claim 4, wherein the rotatable element is of complementary size and shape to said apertured area.

6. A photographing shutter for electron microscopes, comprising: a main fluoroescent plate having a central electron-passing aperture, an auxiliary fluorescent plate rotatably mounted in the aperture of the main fluorescent plate; a main fluorescent screen on the main fluorescent plate, fluorescent screens on both surfaces of the auxiliary fluorescent plate, at least one of said screens substantially consisting of a structure resistive against electron bombardment, means for inclining the entire photographing shutter and for rotating the auxiliary fluorescent plate.

7. A photographing shutter for electron microscopes according to claim 6, in which the fluorescent screen resistive against electron bombardment essentially consists of a fluorescent material coated on the auxiliary fluorescent plate and of a heavy metal coating of the fluorescent material.

8. A photographing shutter for electron microscopes, comprising: a main fluorescent plate having a central electron-passing aperture, a base plate having an electron passing aperture located under the aperture of the main fluorescent plate, an auxiliary fluorescent plate rotatably mounted in the aperture of the main fluorescent plate, an auxiliary shutter plate for the aperture of the base plate, a main fluorescent screen on the main fluorescent plate, fluorescent screens on both surfaces of the auxiliary fluorescent plate, at least one of which consists of a structure resistive against electron bombardment, a projection formed on one side of the auxiliary fluorescent plate and another projection formed on the auxiliary shutter plate, said projections engaging with each other in the course of the rotation of the auxiliary fluorescent plate, flexible supporting means operatively connected between the auxiliary shutter plate and the base plate for normally urging the auxiliary shutter plate to close the electron-passing aperture of the base plate, and means for inclining the photographing shutter as a unit and for rotating the auxiliary fluorescent plate.

9. A fluorescent plate structure for an electron microscope having an electron beam adapted to produce an image, comprising fluorescent plate means having first surface means on which normally impinge the image-producing electrons of the electron beam during normal operation thereof and second surface means of a material relatively resistant to electron bombardment, and selectively operable actuating means for exposing said second surface means to bombardment by the electron beam, wherein said plate means is provided with aperture means for the passage of at least a portion of the electron beam, shutter means for said aperture means, and means for automatically opening said shutter means upon activation of said selectively operable actuating means.

10. A fluorescent plate structure according to claim 9, wherein said second surface means is normally inoperative and is rendered operable by said actuating means.

11. A fluorescent plate structure according to claim 10, wherein said second surface means includes a rotatable element within an apertured area of said first surface means, said rotatable element having on one side thereof a surface material corresponding substantially to that of said first surface means and on the other side thereof the material resistant to electron bombardment.

References Cited

UNITED STATES PATENTS 3,137,791   6/1964   Gutter.
3,345,514   10/1967  Komoda.

RALPH G. NILSON, Primary Examiner.

A. L. BIRCH, Assistant Examiner.

U.S. Cl. X.R.

250—80, 105